United States Patent [19]
Hartley et al.

[11] Patent Number: 5,667,105
[45] Date of Patent: Sep. 16, 1997

[54] PORTION CONTROL VALVE AND SYSTEM AND METHOD UTILIZING THE SAME

[75] Inventors: E. Dale Hartley, Malibu; F. Scott Hartley, Camarillo; Gary F. McKee, Newport Beach; Christopher J. Taylor-McCune, Mission Viejo, all of Calif.

[73] Assignee: Shurflo Pump Manufacturing Co., Santa Ana, Calif.

[21] Appl. No.: 432,359

[22] Filed: May 8, 1995

Related U.S. Application Data

[63] Continuation-in-part of Ser. No. 242,017, May 12, 1994, abandoned.

[51] Int. Cl.⁶ ............................................. B67D 1/08
[52] U.S. Cl. .................... 222/148; 222/309; 222/335; 222/340; 222/380; 222/490
[58] Field of Search ...................... 222/148, 309, 222/335, 340, 380, 377, 387, 365, 490, 510, 518, 383.1, 494; 137/15

[56] References Cited

U.S. PATENT DOCUMENTS

| | | | |
|---|---|---|---|
| 2,216,890 | 10/1940 | Philips | 222/383.1 |
| 3,162,336 | 12/1964 | Erickson | 222/309 |
| 3,194,448 | 7/1965 | Theall . | |
| 3,211,340 | 10/1965 | Zander et al. | 222/494 |
| 3,235,135 | 2/1966 | Robert et al. . | |
| 3,258,175 | 6/1966 | Taylor | 222/490 |
| 3,537,620 | 11/1970 | Artmann | 222/340 |
| 3,777,942 | 12/1973 | Fletcher et al. | 222/387 |
| 3,807,909 | 4/1974 | St. Clair | 222/380 |
| 4,006,847 | 2/1977 | Dooley | 222/325 |
| 4,032,044 | 6/1977 | Flynn et al. . | |
| 4,124,147 | 11/1978 | Priese et al. | 222/380 |
| 4,610,192 | 9/1986 | Hartey et al. | 137/15 |
| 5,158,210 | 10/1992 | Du . | |
| 5,230,443 | 7/1993 | Du . | |

FOREIGN PATENT DOCUMENTS

| | | | |
|---|---|---|---|
| 716752 | 10/1954 | United Kingdom . | |
| 9100219 | 1/1991 | WIPO | 222/380 |

OTHER PUBLICATIONS

Flojet Corp. Publication Dated May 1993 P/N F100–127.

*Primary Examiner*—Philippe Derakshani
*Attorney, Agent, or Firm*—Frank J. Uxa

[57] ABSTRACT

A delivery system comprising a pump connectable to a source of pumpable material, such as flowable condiment, and a control valve including a valve body and a valve element. The valve body has an inlet coupled to the pump to receive the pumpable material from the pump, a resiliently expandable portion chamber, an inlet passage extending from the inlet to the portion chamber, an outlet and a discharge passage extending from the portion chamber to the outlet. The valve element is movable in the valve body between a charging position in which the valve element blocks the discharge passage and does not block the inlet passage so the pump can supply the pumpable material under pressure to the portion chamber to resiliently expand the portion chamber and a discharge position in which the valve element blocks the inlet passage and does not block the outlet passage so the portion chamber can resiliently contract to move the pumpable material from the portion chamber toward the outlet. The outlet is equipped with a normally closed valve.

20 Claims, 6 Drawing Sheets

PORTION CONTROL VALVE AND SYSTEM AND METHOD UTILIZING THE SAME

RELATED APPLICATION

This application is a continuation-in-part of application Ser. No. 08/242,017, filed May 12, 1994, now abandoned.

BACKGROUND OF THE INVENTION

Various techniques have been utilized to deliver flowable condiments to customers of eating establishments such as restaurants and hot dog stands. Flowable condiments include various items such as catsup, mustard, mayonnaise, relish, tartar sauce, cheese, sauces, and the like.

A condiment delivery system must deliver the condiment under pressure and be capable of passing particulates commonly found in some of the condiments, such as blue cheese and relish. It is also important that the system deliver no more than a maximum volume of the condiment during each actuation of the system because otherwise there is a danger of spillage and excessive product loss resulting from keeping of the system in an actuated state for too long a period.

One system for delivering condiments is manually actuable to deliver a known volume of the condiment. However, the reset time, i.e. the time delay before the system can be manually actuated again is longer than desired.

In addition, condiment dispensing systems are to be kept clean, and are often subjected to periodic cleaning. It would be advantageous to provide for the cleaning of a condiment dispensing system which is effective and results in reduced system downtime.

SUMMARY OF THE INVENTION

This invention overcomes the problems noted above and provides many other advantages. With this invention, reset occurs virtually instantaneously so that there is no delay before the system can be actuated again to dispense additional condiments. In one embodiment, the present systems include a separate cleaning path which allows the systems to be effectively cleaned while reducing, or even minimizing, downtime. Although the invention is particularly adapted for delivering flowable condiments, it is also applicable to other flowable materials.

A delivery system constructed in accordance with this invention may include a pump connectable to a source of pumpable material, such as a flowable condiment, and a control valve which includes a valve body and valve element. The valve body has an inlet coupled to the pump to receive the pumpable material from the pump, a resiliently expandable portion chamber, an inlet passage extending from the inlet to the portion chamber, an outlet and a discharge passage extending from the portion chamber to the outlet.

The valve element is movable in the valve body between a charging position in which the valve element blocks the discharge passage and does not block the inlet passage so the pump can supply the pumpable material under pressure to the portion chamber to resiliently expand the portion chamber and a discharge position in which the valve element blocks the inlet passage and does not block the outlet passage. Consequently, in the discharge position the portion chamber can resiliently contract to move the pumpable material from the charging chamber toward the outlet.

This system has a number of advantages. For example, a relatively high pressure from the pump or other pressurizing means can be employed to assure delivery of the pumpable material, and this enables the source of the pumpable material to be remotely located with respect to the control valve, if desired. Thus, even if the pumpable material is a somewhat viscous condiment, the source may be displaced substantially from the control valve thereby giving greater freedom in locating components of the system. The relatively high source pressure also permits keeping the passages leading to the portion chamber relatively large so that particles can pass relatively easily through these passages.

Although the source pressure may be high, the control valve isolates the outlet of the valve from the inlet pressure so there is no danger of subjecting the condiment or other pumpable material at the outlet to undesirably high pressures. Rather, the pressure at the outlet is typically much lower than the inlet pressure and is controlled by the resilience of the resiliently expandable chamber.

In a preferred construction, the valve body has a cavity and the control valve includes a movable wall in the cavity which divides the cavity into the portion chamber and a secondary chamber. Although various different constructions are possible, preferably a resilient element, such as a spring, is provided in the secondary chamber for biasing the movable wall in a direction to reduce the volume of the portion chamber. Consequently, the portion chamber is made resiliently expandable.

In a preferred construction, the valve element includes a slidable spool having inlet and outlet lands and the inlet passage and the outlet passage have inlet and outlet ports, respectively. The outlet land closes the outlet port in the charging position to isolate the outlet from the relatively high pressure at the inlet and the inlet land closes the inlet port in the discharge position to isolate the outlet port from the inlet pressure.

The outlet passage preferably includes a discharge chamber between the outlet port and the outlet. The outlet land is in the discharge chamber in the discharge position and is in and closes the outlet port in the charging position. Consequently, movement of the valve element from the discharge position to the charging position tends to create a reduced pressure in the discharge chamber. This is of particular advantage in reducing the likelihood of the condiment or other flowable material dripping out of the outlet.

To keep the flowable material in the discharge chamber from coming into contact with the air and to reduce the likelihood of dripping out of the outlet, the control valve preferably includes a check valve, that is a normally closed valve, mounted on the valve body, for example, at the outlet. The normally closed valve is operable in response to movement of the pumpable or flowable condiment toward the outlet, for example, by contraction of the portion chamber. In this manner, a quantity of the pumpable condiment is delivered.

The use of such a normally closed valve is particularly applicable to systems which deliver pumpable or flowable condiments so that the condiment, prior to delivery, is at least somewhat protected from being exposed to the ambient environment (thereby remaining fresh and tasty) and to avoid unsightly spillage or accumulation of condiment at the outlet. The reduced pressure in the discharge chamber resulting from movement of the valve element to the charging position tends to urge or draw the check valve toward a closed position. Consequently, this reduced pressure works with the check valve to minimize the likelihood of dripping out of the outlet and air entry into the discharge chamber through the outlet. Although various different kinds of check valves can be used, a duck bill check valve is preferred.

Although the valve element can be moved by a motor, if desired, preferably a portion of the valve element extends out of the valve body to provide an actuator which can be manually actuated. In the preferred arrangement, the actuator is manually moved to move the valve element from the charging position to the discharge position and a biasing member urges the valve element back toward the charging position. The force of the biasing member is selected so that it can rapidly return the valve element to the charging position thereby making reset time virtually instantaneous. One advantage of the present system is that only a portion of the flowable material in the portion chamber can be dispensed or delivered. If this is done, the portion chamber will be rapidly completely filled with the flowable material after the valve element is returned to the changing position. This partial delivery feature is in contrast to motor, for example, solenoid motor, driven systems which dispense only a fixed sized portion.

In one very useful construction, a cleaning passage is provided which leads from the portion chamber to the exterior of the valve body. Such a cleaning passage provides for cleaning, for example, periodic cleaning, of the portion chamber so that any residue of the flowable material remaining in the portion chamber after repeated charge/discharge cycles can be removed. This is particularly important where the flowable material is a condiment or other food product. For example, periodic cleaning and/or sanitizing, such as on the order of about once a day to about once a week, reduces or even eliminates the risk that the flowable material being delivered is contaminated by material residue in the system, for example, in the portion chamber. Any suitable cleaning and/or sanitizing composition, for example, warm or hot water, may be used.

Preferably, the composition used is a liquid, more preferably, an aqueous liquid, which has no significant detrimental effect on the system or the flowable material to be delivered by the system. A particularly useful cleaning composition is liquid water.

In one useful embodiment, a control member is provided for selectively blocking and unblocking the cleaning passage. Thus, the present system can be considered to have a cleaning mode in which the portion chamber is being cleaned, and the cleaning passage is unblocked, and a product delivering mode in which the portion chamber is being utilized to deliver flowable material and the cleaning passage is blocked. The control member preferably includes a cleaning valve having an open position to allow fluid, for example, cleaning fluid, to exit the portion chamber through the cleaning passage and a closed position to prevent fluid from exiting the portion chamber through the cleaning passage. With the control member in the unblocking position, for example, with the cleaning valve in the open position, cleaning composition is preferably passed through the portion chamber so that continuing agitation is achieved. Such continuing agitation enhances the effectiveness of the cleaning mode of the system.

One useful construction of the present system provides that the outlet passage includes a discharge chamber having a wall upstream of the outlet. In this embodiment, the valve element preferably includes a deflecting surface positioned so that with the valve element in the discharge position, the flowable material from the portion chamber is directed toward the wall. By deflecting at least a portion of the flowable material, for example, the flowable condiment, against a wall between the portion chamber and the outlet, energy present in the flowable material is preferably dissipated. Importantly, this construction has been found to effectively increase the degree of control of the flow of flowable material out of the outlet. The deflecting surface feature of the present invention, as described herein, particularly in combination with a relatively large diameter discharge chamber—which acts as a flowable material accumulator—and the normally closed valve, provides that the flowable material exits the normally closed valve at the outlet in an effectively controlled and smooth manner, for example, without condiment "spitting" or "splattering" at the system outlet.

In one embodiment, the portion chamber has a variable maximum volume. This allows the user of the system to control the amount or portion of flowable material to be delivered. A particularly useful construction provides that a plurality of inserts are included. Each of these inserts have a different length and are effective to control the maximum volume of the portion chamber. For example, the control valve can include an elongated tube mounted on the valve body and extending into the secondary chamber. Any of the plurality of inserts is receivable in the tube to form a stop to limit the maximum volume of the portion chamber. The use of a different insert may be considered a gross or step adjustment in the maximum volume of the portion chamber. The use of a system including a plurality of inserts advantageously allows the maximum volume of the portion chamber to be varied over a wide range without increasing the size of the system's envelope (or exterior dimension). The tube is preferably threadably coupled to the valve body so that the location of the stop can be changed, preferably over a substantially continuous range, to change the maximum volume of the portion chamber. Using this threadably coupled feature, one can change the maximum volume of the portion chamber over a range using any one of the inserts. This feature may be considered to be a fine or small adjustment of the maximum volume of the portion chamber.

The flowable material may be supplied to the control valve by a pump or any other means or technique that will provide it under the desired pressure. With this invention, the pump or other pressuring means can supply the pumpable material to the control valve under essentially continuous pressure because the control valve appropriately isolates the outlet of the control valve from the incoming pressure.

Any one or more of the features described herein can be used alone or in any combination provided that such features are consistent or compatible with one another. Each of the individual features and all such compatible combinations of features are included within the scope of the present invention.

The invention also includes a method of delivering a flowable condiment which includes supplying the flowable condiment under pressure through an inlet passage of a control valve to a resiliently expandable portion chamber with the control valve blocking flow of the flowable condiment from the portion chamber to an outlet passage to an outlet of the control valve. The method also includes actuating the control valve to first block the inlet passage to prevent the flowable condiment from being supplied to the portion chamber and then opening the outlet passage to allow the resiliently expandable portion chamber to contract and move the flowable condiment from the portion chamber toward the outlet.

The invention, together with additional features and advantages thereof may best be understood by reference to the following description taken in connection with the accompanying illustrative drawings.

DESCRIPTION OF THE PREFERRED EMBODIMENTS

Figure 1:
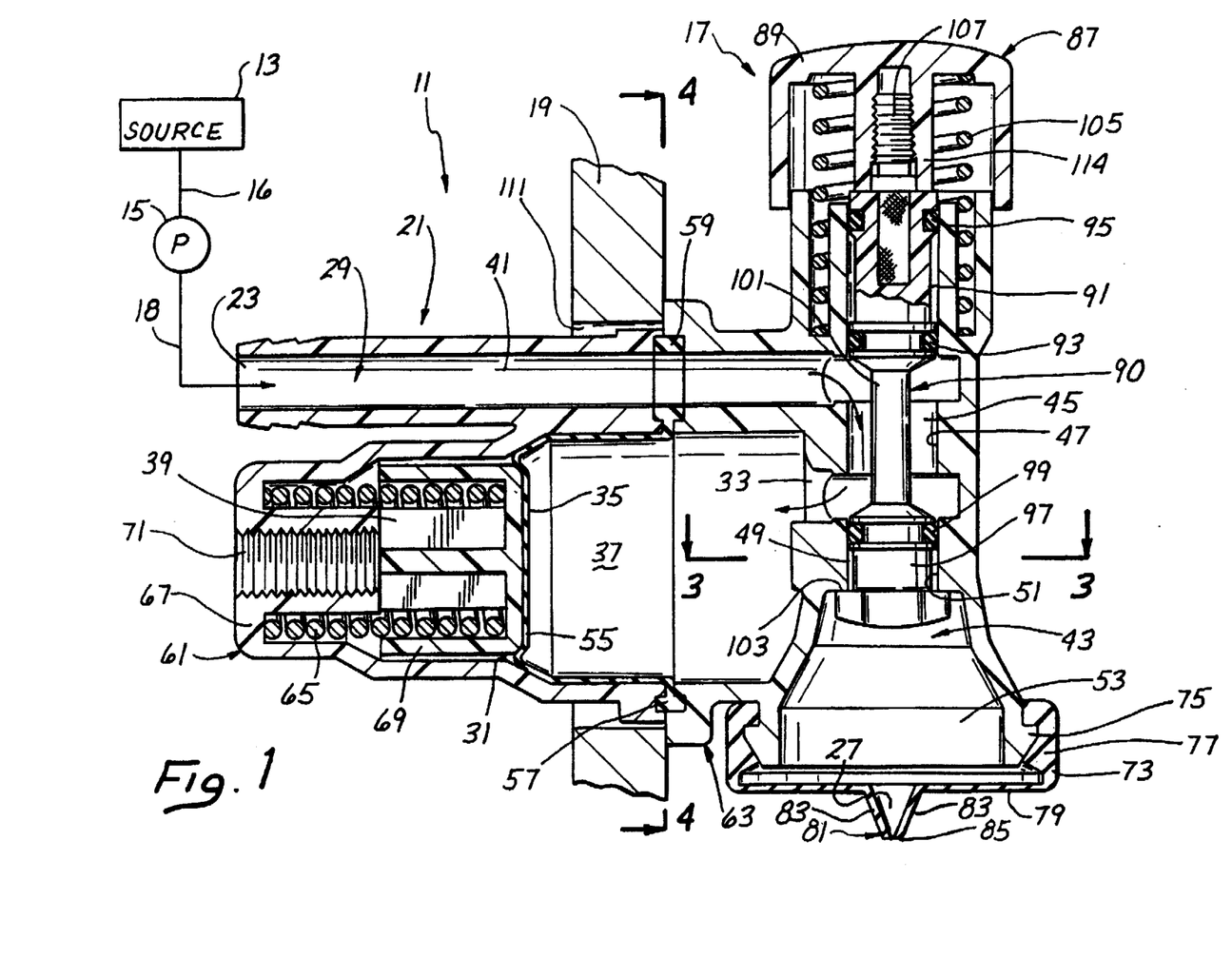
FIG. 1 is a partially schematic view of a condiment delivery system with the control valve being shown in axial cross section and being affixed to a bulkhead. The valve element is in the charging position.

FIG. 1 shows a system 11 for delivering a flowable condiment which includes a source 13 of a flowable condiment, a pump 15 coupled to the source 13 by a conduit 16 and a control valve 17 coupled to the pump 15 by a conduit 18 to receive the flowable condiment under pressure, such as 40 psi, from the pump. The control valve 17 may be coupled to a bulkhead 19 or other suitable supporting structure, if desired. The source 13 may be any suitable container for retaining the material to be pumped which, in this case is a flowable condiment. A preferred type of source is a bag in a box with the bag being collapsible and sealed so as to prevent air from contacting the condiment contained in the bag. Bag in the box sources are known and are commonly used for beverages and beverage components.

The pump 15 is a positive displacement pump, and it must be capable of handling condiments. For example the pump 15 may be a double acting reciprocating pump of the general type shown and described in Hartley et al U.S. Pat. No. 4,610,192.

The control valve 17 includes a valve body 21 having an inlet 23 coupled by the conduit 18 to the discharge side of the pump 15, an outlet 27, a passage 29 leading from the inlet to the outlet and a cavity 31 which communicates with the passage 29 via a leg 33 of the passage 29. A movable wall 35 in the cavity 31 divides the cavity into a portion chamber 37 and a secondary chamber 39. The passage 29 includes an inlet passage 41 extending from the inlet 23 to the portion chamber 37 and a discharge passage 43 extending from the portion chamber 37 to the outlet 27. In the illustrated embodiment, the leg 33 of the passage forms a portion of both the inlet passage 41 and the discharge passage 43.

The inlet passage section 41 has an inlet port 45 defined by a bore 47 which is at right angles to a main section of the inlet passage 41 and which couples such main section to the leg 33. Similarly, the outlet passage 43 has an outlet port 49 defined by a bore 51 which, in this embodiment, is coaxial with the bore 47 and which joins the leg 33 to an enlarged discharge chamber 53.

The portion chamber 37 is resiliently expandable. In this regard, the movable wall 35 includes a flexible diaphragm 55 having resilient annular flanges 57 and 59 which are clamped between body sections 61 and 63 of the valve body 21. The flanges 57 and 59 also form fluid tight seals between the body sections 61 and 63.

A resilient element in the form of a coil compression spring 65 acts between an end 67 of the body section 61 and a slidable piston 69 to urge the diaphragm 55 to the right as viewed in FIG. 1, i.e. in a direction to reduce the volume of the portion chamber 37. Thus, the portion chamber 37 is resiliently expandable in response to a pressure in the portion chamber sufficient to compress the spring 65. Although the construction shown in FIG. 1 is preferred, the resilient, expandable portion chamber 37 can be constructed in different ways such as by utilizing a different form of resilient element, a resiliently expandable bellows, or the like. The spring 65 can be sized to achieve the desired delivery rate of the condiment. The spring force can be adjusted by changing springs or by a suitable mechanism to adjust the force applied by the spring.

The maximum volume of the portion chamber 37 is determined by contact of the left end of the piston 69 against an adjusting screw 71. The maximum volume of the portion chamber 37 can be increased or decreased such as by turning of the adjusting screw 71 to change its axial position.

Figures 3, 4, 5:
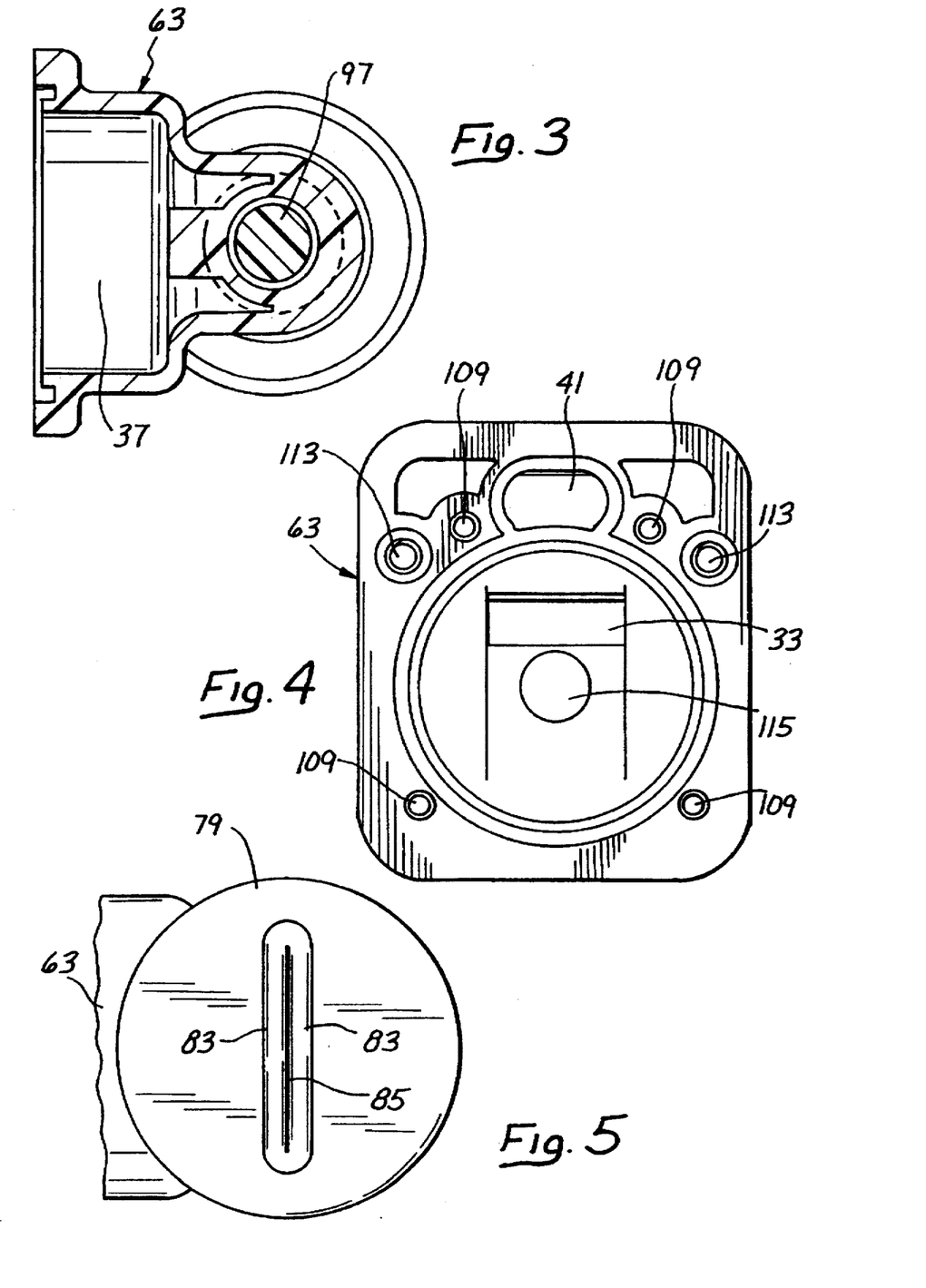
FIG. 3 is a sectional view taken generally along line 3—3 of FIG. 1 and illustrating a portion of the valve body with some of the inner components removed.
FIG. 4 is an elevational view taken generally along line 4—4 of FIG. 1 and illustrating a portion of the valve body with the interior components removed.
FIG. 5 is a bottom plan view of the outlet and adjacent regions of the control valve.

The valve body 21 may also be considered as including a cap 73 of an elastomeric material such as rubber or the like snapped over an annular rib 75 of the body section 63. The cap 73 includes a peripheral wall 77 and an end wall 79. A check valve 81 is formed in the end wall 79. Although various different kinds of check valves can be used, in the embodiment illustrated, the check valve 81 is a duck bill check valve, and as such comprises resilient arms 83 (FIGS. 1 and 5) biased toward an elongated slit 85. The resilience of the arms 83 tends to close the slit 85 in the absence of a fluid pressure within the discharge chamber 53 exceeding the resilient force of the arms and any external pressure acting on the arms. In this embodiment the slit 85 defines the outlet 27.

The control valve 87 which extends out of the valve body 21 to provide an actuator 89 which can be manually actuated. The valve element 87, which can be constructed of a suitable number of pieces to facilitate assembly, includes a spool 90 which has an inlet land 91 carrying annular seals 93 and 95 and an outlet land 97 carrying an annular seal 99. The lands 91 and 97 are joined by a rod 101 of reduced diameter so as to form a relatively large annular passage in the bore 47 in the charging position shown in FIG. 1. The relatively large dimension of this annular passage facilitates the passage of particulate materials into the portion chamber 37.

The valve element 87 is elongated, and it has a shoulder 103 in the discharge chamber 53 which is engageable with a surface of the body section 63 at the outlet end of the outlet port 49 to define the charging position, i.e. the maximum upward position (as viewed in FIG. 1) of the valve element 87. The shoulder 103 may be provided by the head of a screw which may be removed from the remainder of the valve element 87 to facilitate assembly. A biasing member in the form of a coil compression spring 105 acts between the body section 63 and the actuator 89 to urge the valve element 87 upwardly to the charging position shown in FIG. 1. Preferably the actuator 89 is a separate component coupled to the spool 90 of the valve element 87 by a threaded fastener 107 which is molded into the spool 90.

The body sections 61 and 63 may be held together by fasteners extending through fastener passages 109 (FIG. 4) in the body section 63 and corresponding passages (not shown) in the body section 61. If desired, the control valve 17 may be mounted in an opening 111 of the bulkhead 19 as shown in FIGS. 1 and 2 and affixed to the bulkhead by fasteners (not shown) extending through mounting holes 113 (FIG. 4) in the body section 63.

Figure 2:
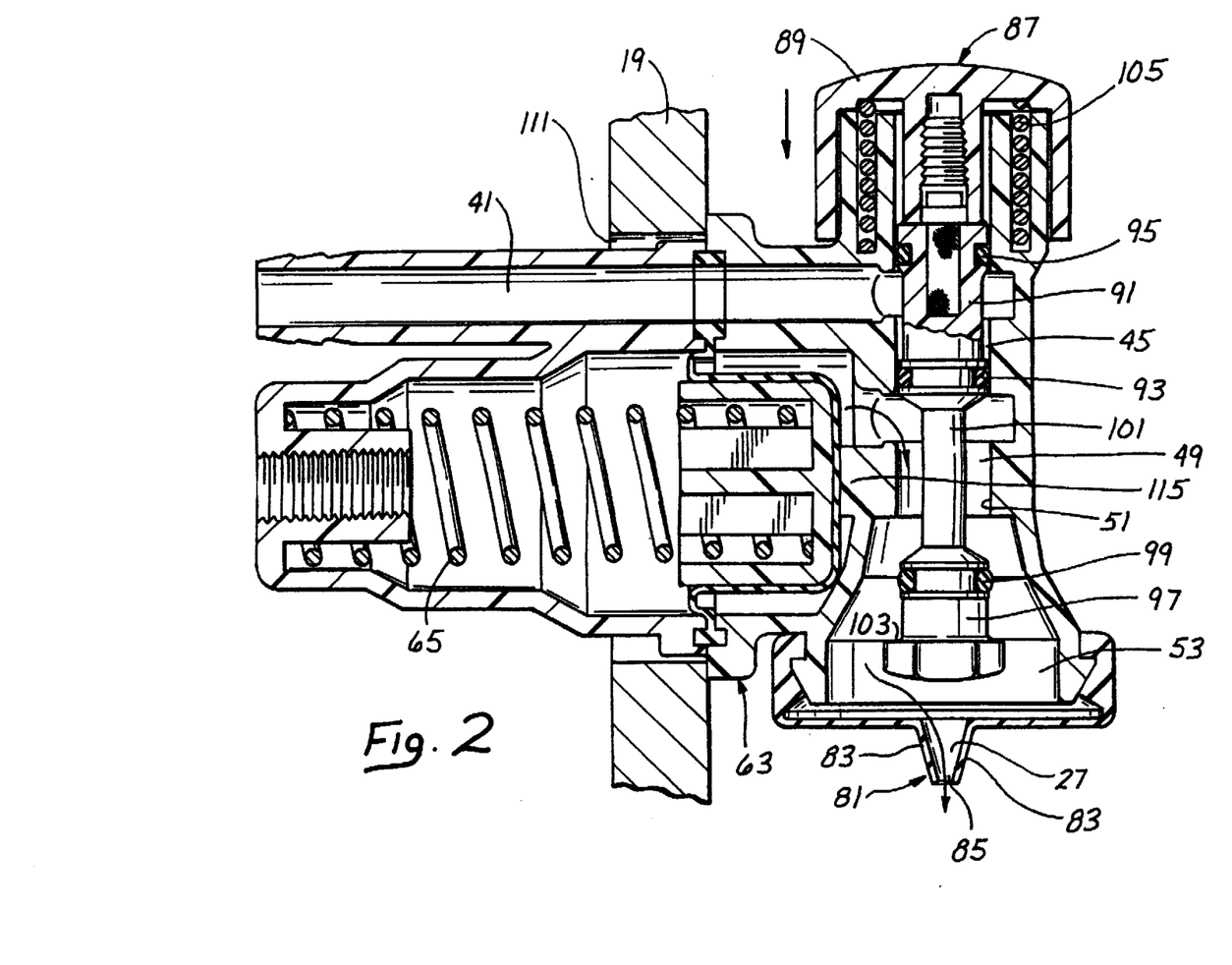
FIG. 2 is an axial sectional view of the control valve with the valve element in the discharge position.

The valve element 87 is movable between a charging position (FIG. 1) and a discharge position (FIG. 2). In the charging position, the land 97, and in particular the seal 99, is in and sealingly engages the bore 51 so that the outlet port 49 is closed and the discharge passage 43 is blocked. Consequently, there can be no flow of condiment from regions upstream of the outlet port 49 to the outlet 27. However, in the charging position, the valve element 87 does not block the inlet passage 41 so the pump 15 can supply the flowable condiment under pressure to the portion chamber 37. The delivery pressure of the pump is high enough to cause the flowable material to expand the portion chamber 37 by forcing the diaphragm 55 and the piston 69 to the left against the biasing action of the spring 65. Consequently, the portion chamber 37 is resiliently expanded. The seals 93 and 95 prevent leakage of the condiment upwardly between the spool 90 and a sleeve 114 of the body section 63.

When it is desired to dispense condiment from the system 11, the user depresses the actuator 89 against the biasing action of the spring 105 to thereby move the valve element 87 from the charging position of FIG. 1 to the discharge position of FIG. 2. In moving to the discharge position, the land 91 and in particular the seal 93 first closes the inlet port 45, and this is brought about by the presence of the land 91 and the seal 93 in the bore 47 with the seal 93 sealingly engaging the bore. The seal 95 prevents leakage of the condiment upwardly out through the actuator 89. Because the inlet passage 41 is blocked by the valve element 87, the high pressure in the inlet passage 41 is sealed off from the outlet 27.

After the inlet port 45 is closed, the seal 99 leaves the bore 51 and opens the outlet port 49. Accordingly, in the discharge position of FIG. 2, the outlet land 97 and the seal 99 are in the discharge chamber 53 and the valve element 87 does not block the outlet port 49 or the discharge passage 43. Consequently, there is an open path via the discharge passage 43 from the portion chamber 37 to the outlet 27. This enables the spring 65 to extend as shown in FIG. 2 to reduce the volume of the portion chamber 37 and to force the condiment from the portion chamber toward and into the discharge chamber 53. Assuming that the discharge chamber 53 was previously charged with condiment, the contraction in volume of the portion chamber 37 will force the check valve 81 open by overcoming the resilient closing force of the arms 83. This allows condiment to flow through the outlet 27 and the open slit 85 of the check valve. This results in dispensing a volume of the condiment nearly equal to the volume of the portion chamber 37. The travel of the diaphragm 55 to the right is limited by a stop 115 on the body section 63.

In the discharge position, the relatively small diameter rod 101 extends through the bore 51 leaving a relatively large annular passage for the flow the condiment. This reduces the likelihood of particulates becoming entrapped in flowing toward the outlet 27.

After depressing the actuator 89 to move the valve element to the discharge position of FIG. 2, the actuator is released whereupon the spring 105 immediately and rapidly returns the valve element 87 to the charging position of FIG. 2. In traveling to the charging position, the land 97 and the seal 99 are returned to the bore 51 with the seal 99 forming a sliding seal with the bore 51. Continued upward movement of the valve element 87 moves the land 97 and the seal 99 upwardly, and this tends to create a reduced pressure in the discharge chamber 53. This reduced pressure in the discharge chamber 53, which is a sub-atmospheric pressure, allows the external atmospheric pressure acting on the arms 83 to hold the arms tightly together to thereby urge the check valve to the closed position.

With the arrangement defined above, the pump 15 can maintain the condiment which the pump supplies to the control valve 17 under pressure in both the charging and discharge positions of the valve element 87. However, because the valve element 87 first closes off the inlet passage 41 before it opens the outlet passage 43 in moving to the discharge position, pump pressure is not experienced at the outlet 27. Moreover, the pressure at which the condiment is delivered to the outlet by the portion chamber 37 is less than the pressure of the condiment delivered to the portion chamber.

Thus, with the arrangement described above, the flowable condiment is supplied under pressure through the inlet passage 41 of the control valve 17 to the resiliently expandable portion chamber 37 with the control valve blocking flow of the flowable condiment from the portion chamber through the outlet passage 43 to the outlet 27 of the control valve. By actuating the control valve 17, it first blocks the inlet passage 41 to prevent the flowable condiment from being supplied to the portion chamber 37 and then it opens the outlet passage 43 to allow the resiliently expandable portion chamber 37 to contract and move the flowable condiment from the portion chamber toward the outlet 27.

Another feature of this invention is that there is no need to provide a valve between the portion chamber 37 and the outlet 27 to control the rate of delivery of the flowable condiment from the portion chamber to the outlet. Consequently, the discharge passage 43 can be relatively large and is capable of passing particulates. In order to adjust the rate at which the flowable condiment is moved toward the outlet 27 by the portion chamber 37, it is only necessary to adjust the force of the spring 65 because the force applied by the resiliently expandable portion chamber to the flowable condiment is derived from this spring. As indicated above, the force applied by the spring 65 can be adjusted by changing springs or by any known and suitable spring force adjusting mechanism (not shown).

FIGS. 6-11 illustrate another embodiment of a flowable condiment delivery system, shown generally at 211. Unless otherwise expressly described, system 211 is structured and functions similarly to system 11. Components of system 211 which correspond to components of system 11 are identified by the same reference numerals increased by 200.

Figure 6:
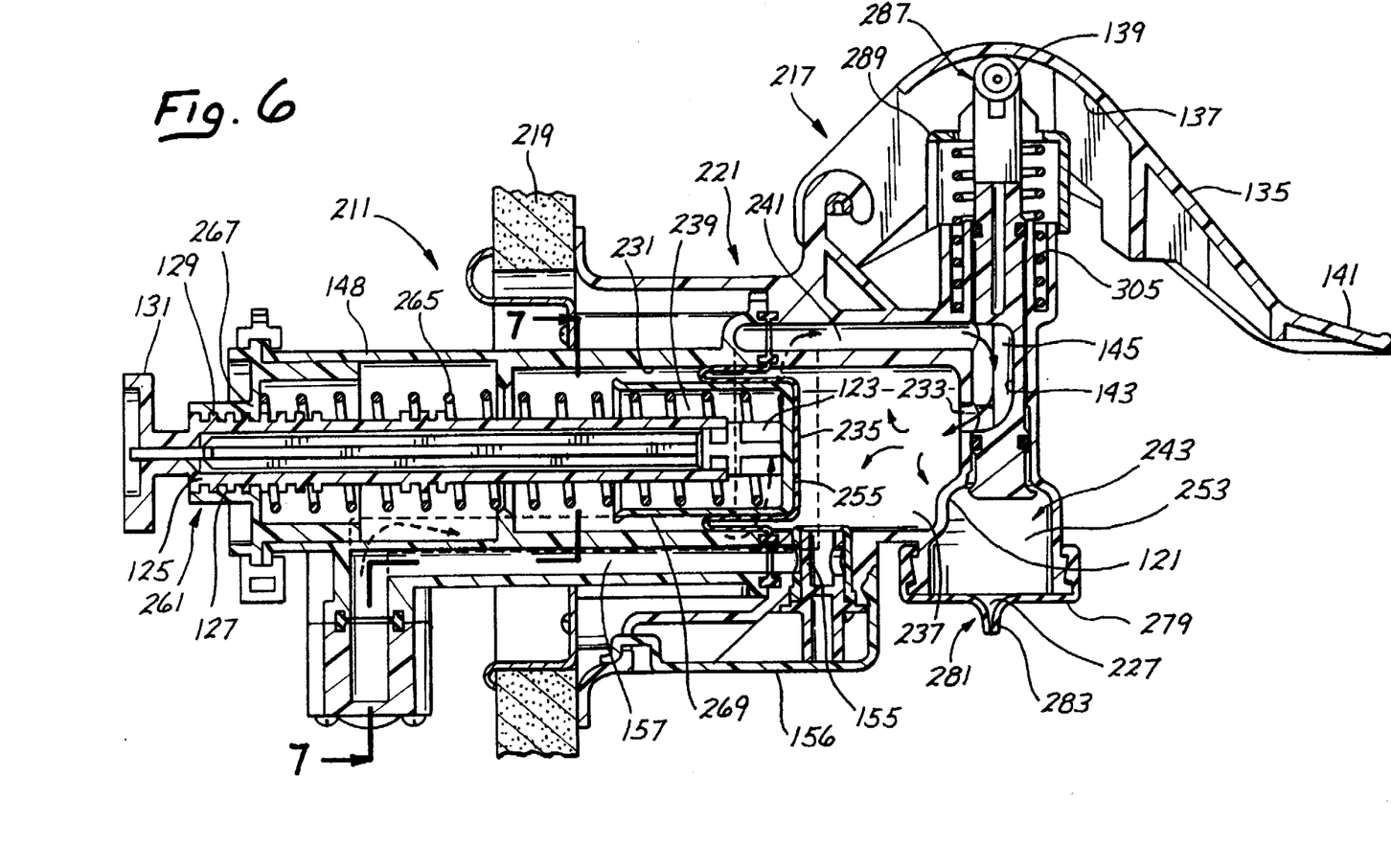
FIG. 6 is a view of another embodiment of the present condiment delivery system with the control valve being shown in axial cross-section and being affixed to a bulkhead. The valve element is in the charging position and the cleaning valve is in the closed position.
Figure 7:
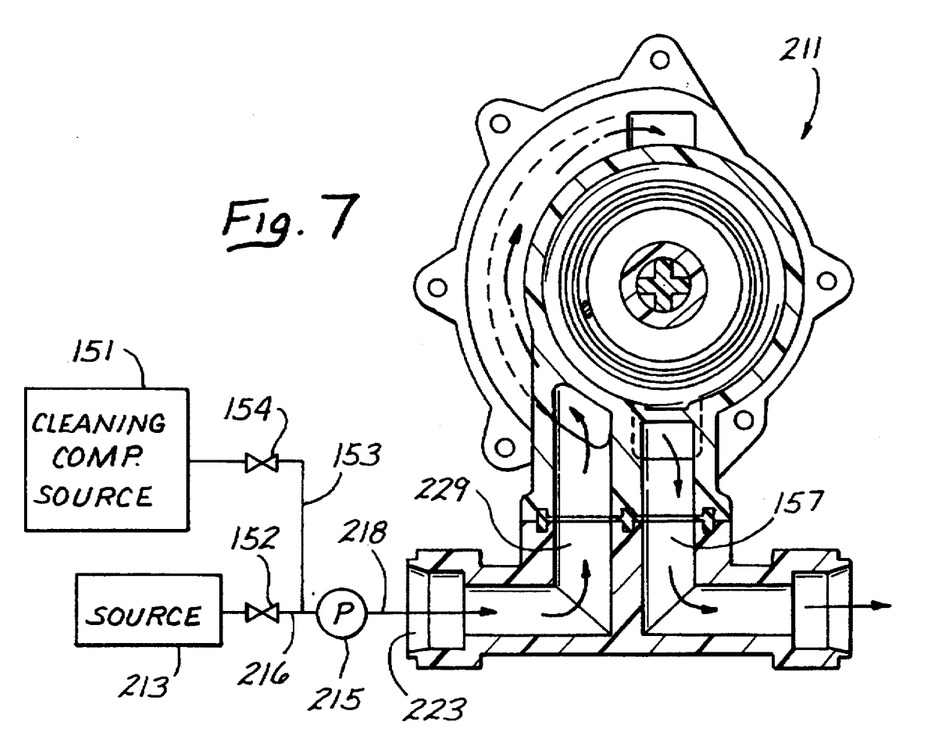
FIG. 7 is a sectional view taken generally along line 7—7 of FIG. 6 and illustrating a portion of the flow path of the cleaning composition.

With reference to FIGS. 6 and 7, system 211 includes a source 213 of a flowable condiment, a pump 215 coupled to the source 213 by a conduit 216 and a control valve 217 coupled to the pump 215 by a conduit 218 to receive the flowable condiment under pressure from the pump. The control valve 217 may be coupled to a bulkhead 219 or other suitable supporting structure, if desired.

The control valve 217 includes a valve body 221 having an inlet 223 coupled by the conduit 218 to the discharge side of the pump 215, an outlet 227, a passage 229 leading from the inlet to the outlet and a cavity 231 which communicates with the passage 229 via a leg 233 of the passage 229. A movable wall 235 in the cavity 231 divides the cavity into a portion chamber 237 and a secondary chamber 239. The passage 229 includes an inlet passage 241 extending from the inlet 223 to the portion chamber 237 and a discharge passage 243 extending from the portion chamber 237 to the outlet 227. Discharge chamber 253 is partially defined by upper sidewall 121.

The portion chamber 237 is resiliently expandable. A resilient coil compression spring 265 acts between an end 267 of the body section 261 and a slidable piston 269 to urge the diaphragm 255 to the right as viewed in FIG. 6, i.e. in a direction to reduce the volume of the portion chamber 237. Thus, the portion chamber 237 is resiliently expandable in response to a pressure in the portion chamber sufficient to compress the spring 265.

The maximum volume of the portion chamber 237 is determined by contact of the left end of the piston 269 against an insert 123, which is located in tube 125. Body section 261 includes threads 127 which engage threads 129 of tube 125. The maximum volume of the portion chamber 237 can be increased or decreased such as by turning of the adjusting knob 131 to change the axial position of insert 123. In this manner, relatively fine or limited adjustments in the maximum volume of portion chamber 237 can be made.

Figure 10:
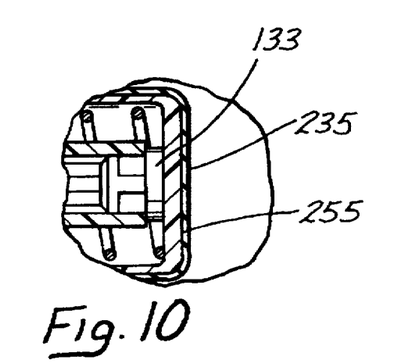
FIG. 10 is a fragmentary view, in section, of an alternate insert acting to control the maximum volume of the portion chamber.
Figure 11:
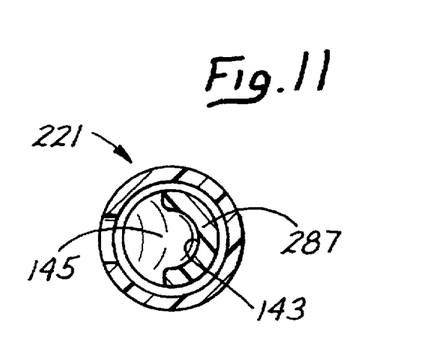
FIG. 11 is a sectional view taken generally along line 11—11 in FIG. 8 and illustrating the general shape of a portion of the valve element.

One additional feature illustrated by system 211 involves the use of a different length insert, such as second insert 133 shown in FIG. 10, in place of insert 123. Second insert 133 is used when it is desired to make a large or gross adjustment (increase) in the maximum volume of portion chamber 237. A series or plurality of different length inserts can be provided to allow rapid and convenient changes in the maximum volume of portion chamber 237. Thus, the use of such inserts allows one to effectively provide for gross adjustments and fine adjustments in the maximum volume of portion chamber 237.

A normally closed valve 281, which may be identical to the valve 81 (FIG. 1), is formed in the end wall 279.

The portion of valve element 287 that extends out of the valve body 221 provides an actuator 289 which can be manually actuated. A lever arm 135 is pivotably secured to valve body 221 and is positioned so that the underside surface 137 of the lever arm comes into contact with a rotable wheel 139 which is the uppermost portion of actuator 289. With this construction, the actuator 289 is manually actuated by pressing down on the unsecured end 141 of lever arm 135. A mechanical advantage is achieved using lever arm 135.

Figure 8:
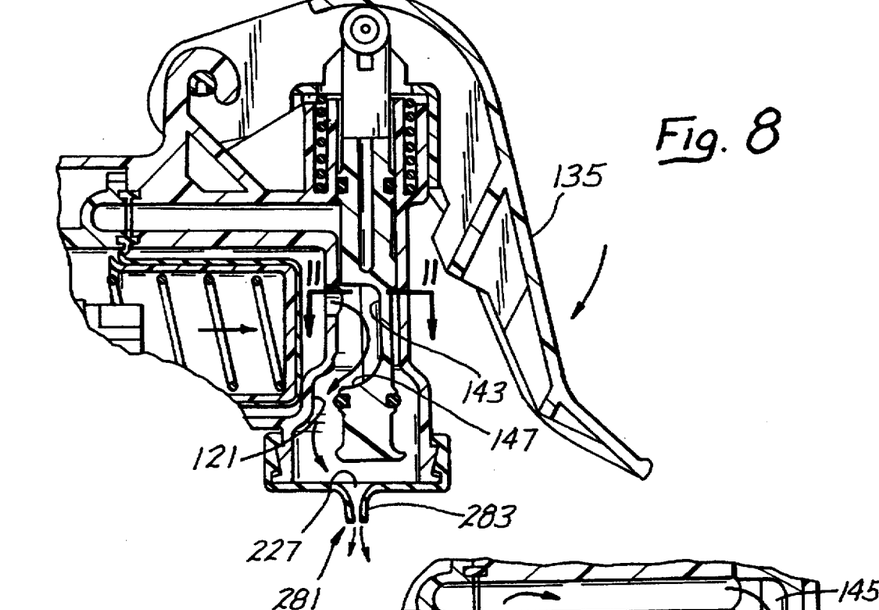
FIG. 8 is an axial sectional view of the control valve of the embodiment shown in FIG. 6 with the valve element in the discharge position.

The valve element 287 includes a generally curved surface 143 which defines a non-annular (or partially annular) flowpath portion 145. Thus, depending on the position of valve element 287, portion 145 can be part of the flowpath for the flowable condiment from inlet passage 241 to portion chamber 237 or from the portion chamber to discharge passage 243. One important aspect of curved surface 143 is its configuration at its bottom (as shown most clearly in FIG. 8). The bottom of curved surface 143 is defined by a deflecting surface 147 which is positioned so that, with valve element 287 in its discharge position (as shown in FIG. 8), the flowable condiment from portion chamber 237 is deflected toward sidewall 121 before being passed through outlet 227. Deflecting the flowable condiment off of sidewall 121, together with the relatively large diameter discharge chamber 253 and valve 281, has been found to render the flow of condiment from outlet 227 more controlled and smoother. Less "spitting" or "splattering" of the condiment as it passes through the outlet 227 is observed. Deflecting the condiment off sidewall 121 may result in dissipating the energy that the condiment has as it exits portion chamber 237.

When it is desired to dispense condiment from system 211, the user depresses the lever arm 135 to thereby move the valve element 287 from the charging position of FIG. 6 to the discharge position of FIG. 8.

Assuming that the discharge chamber 253 was previously charged with condiment, the contraction in volume of the portion chamber 237 will force the valve 281 open by overcoming the resilient closing force of the arms 283. This allows condiment to flow through the outlet 227. This results in dispensing a volume of the condiment nearly equal to the volume of the portion chamber 237.

After depressing the lever arm 135 to move the valve element 287 to the discharge position of FIG. 8, the lever arm is released whereupon the valve element immediately and rapidly returns to the charging position of FIG. 6 under the biasing force of a spring 305. Resulting reduced pressure in the discharge chamber 253, as described in the embodiment of FIGS. 1–5, allows the external atmospheric pressure acting on the arms 283 to hold the arms tightly together to thereby urge the valve 281 to its normally closed position.

The portions of system 211 which normally are not exposed to flowable condiment are preferably structured to be in tight fitting, or even sealing, relation to each other. For example, consider the end 267 of body section 261 in relation to the spring housing portion 148, threads 127 in relation to threads 129, and insert 123 in relation to tube 125. This tight fitting or sealing feature effectively prevents flowable material from leaking out of system 211, for example, in the event of the failure of diaphragm 255. Further, the portions of system 211 which normally are exposed to flowable condiment are preferably structured to avoid crevices, small gaps and other irregular surface features in which the condiment can be disadvantageously retained.

An additional feature of system 211 shown in FIGS. 6–11 is the provision for a cleaning cycle. Thus, when it is desired to clean and/or sanitize system 211, the cleaning cycle, described herein, is employed. Such cleaning and/or sanitizing is particularly important when system 211 is being used to dispense condiments and other food products.

Figure 9:
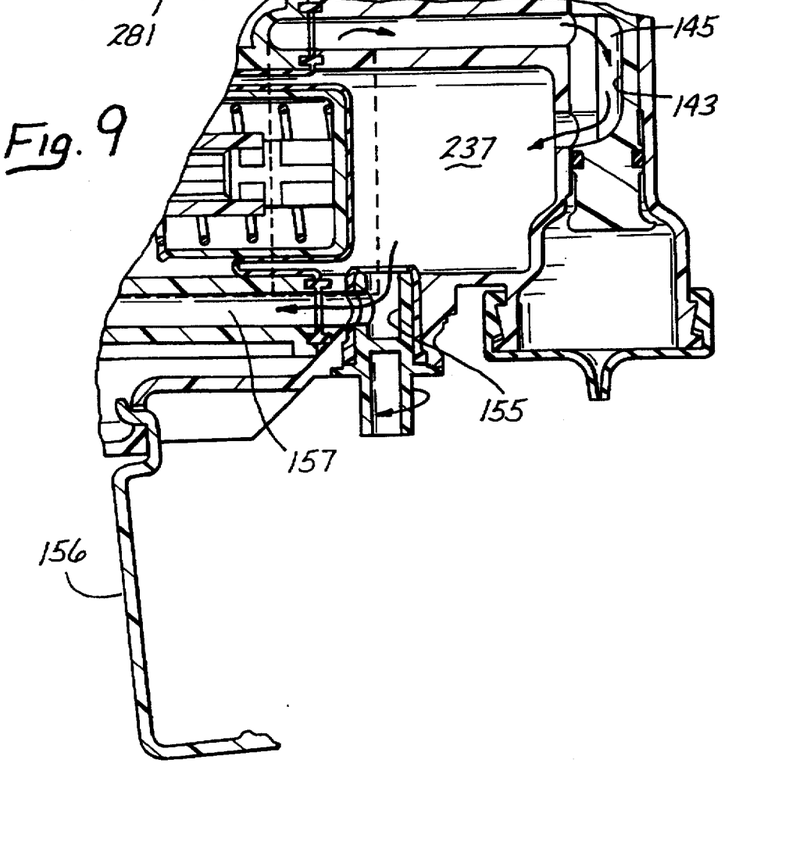
FIG. 9 is a partial sectional view showing the valve element in the charging position and the cleaning valve in the open position.

With particular reference to FIG. 7, cleaning composition source 151 is coupled to pump 215 through conduit 153. When it is desired to clean system 211, condiment source 213 is isolated from pump 215, for example, by turning valve 152 to the closed position. In other words, when cleaning composition is to be pumped by pump 215, condiment from source 213 is not. Valve 154 is placed in the open position to place cleaning composition source 151 in fluid communication with pump 215. The cleaning composition, for example, water at an elevated temperature, is pumped into inlet 223 through conduit 218 and into passage 229 and inlet passage 241. With valve element 287 in the charging position, the cleaning composition passes from the inlet passage 241 through passage 145 into portion chamber 237. During a portion of the cleaning cycle, cleaning valve 155 is opened. Pivoting a casing member 156 clockwise from the position of FIG. 6 to the portion of FIG. 9 exposes the cleaning valve 155 so it can be manually operated. With cleaning valve 155 opened, as shown in FIG. 9, and valve element 287 in the charging position, cleaning composition passes into portion chamber 237 with continuing agitation and out of the portion chamber through the cleaning valve and out of system 211 via cleaning passage 157.

During another portion of the cleaning cycle, cleaning valve 155 is closed, thereby blocking cleaning composition from portion chamber 237 from passing into cleaning passage 157. In this mode, lever arm 135 is depressed, thereby moving valve element 287 from the charging position to the discharge position. This action, which may be repeated a number of times, for example, on the order of about 3 to about 10 times, causes the cleaning composition from the portion chamber 237 to exit through passage 145, discharge chamber 253 and outlet 227. This repeated actuation of valve element 287 effectively cleans the portions of system 211 other than portion chamber 237. If compression spring 265 is sufficiently weak, cleaning valve 155 need not be placed in the closed position before depressing lever arm 135. In this circumstance, all parts of the system 211 which are exposed to the flowable condiment can be cleaned at the same time with cleaning valve 155 in the open position. The final configuration for the cleaning cycle is preferably one in which the cleaning valve 155 is open so that substantially all of the cleaning composition can be removed from the portion chamber 237. An important advantage of system 211 is that all of the system which is exposed to the condiment, including the pump, passages, control valve, portion chamber and normally closed valve, can be effectively cleaned/sanitized without any disassembling. This reduces system downtime and may lead to more frequent system cleanings and less contamination of the system.

In order to place the system 211 in a configuration for dispensing of flowable condiment, the pump 215 is temporarily stopped, valve 154 is placed in the closed position and valve 152 is placed in the open position. Also, cleaning valve 155 is closed and casing member 156 is pivoted back into its position shown in FIG. 6. At this point, pump 215 is started and the system is ready to dispense condiment. It may be desirable to depress the lever arm 135 a limited number of times to remove any last traces of the cleaning composition prior to placing system 211 in condiment dispensing service.

Although exemplary embodiments of the invention have been shown and described, many changes, modifications and substitutions may be made by one having ordinary skill in the art without necessarily departing from the spirit and scope of this invention.

We claim:

1. A condiment delivery system for a pumpable condiment comprising:

a pump connectable to a source of a pumpable condiment;

a control valve including a valve body and a valve element;

said valve body having an inlet coupled to the pump to receive the pumpable condiment from the pump, a resiliently expandable portion chamber, an inlet passage extending from the inlet to the portion chamber, an outlet and a discharge passage extending from the portion chamber to the outlet;

the valve element being movable in the valve body between a charging position in which the valve element blocks the discharge passage and does not block the inlet passage so the pump can supply the pumpable condiment under pressure to the portion chamber to resiliently expand the portion chamber and a discharge position in which the valve element blocks the inlet passage and does not block the discharge passage so the portion chamber can resiliently contract to move the pumpable condiment from the portion chamber toward the outlet; and a single normally closed valve mounted on the valve body, said normally closed valve being openable in response to movement of the pumpable condiment toward the outlet by contraction of the portion chamber whereby a quantity of the pumpable condiment is delivered, said normally closed valve being the only such valve mounted on the valve body.

2. A system as defined in claim 1 wherein the system includes mounting structure for mounting the control valve with the outlet facing downwardly.

3. A system as defined in claim 1 wherein the discharge passage includes a discharge chamber between the portion chamber and the outlet and movement of the valve element from the discharge position to the charging position tends to create a reduced pressure in the discharge chamber.

4. A system as defined in claim 3 wherein the normally closed valve tends to be urged to a closed position by the reduced pressure in the discharge chamber.

5. A system as defined in claim 1 wherein the discharge passage includes a discharge chamber between the portion chamber and the outlet and the normally closed valve includes a duck bill check valve at the outlet.

6. A valve as defined in claim 1 wherein a portion of the valve element extends out of the valve body to provide an actuator which can be manually actuated.

7. A control valve comprising:

a valve body having an inlet, an outlet, a first passage leading from the inlet to the outlet and a cavity communicable with the first passage;

a movable wall in said cavity dividing the cavity into a portion chamber communicable with the first passage and a secondary chamber;

a resilient element in the secondary chamber for biasing the movable wall in a direction to reduce the volume of the portion chamber whereby the portion chamber is made resiliently expandable;

a valve element movable in the valve body between a charging position in which the valve element allows flow of flowable material from the inlet through the first passage to the portion chamber to resiliently expand the portion chamber against the biasing action of the resilient element and blocks flow of flowable material from the portion chamber through the first passage to the outlet and a discharge position in which the valve element blocks flow of flowable material from the inlet through the first passage to the portion chamber and allows flow of flowable material from the portion chamber through the first passage to the outlet so that the resilient element can force the flowable material from the portion chamber toward the outlet;

said valve body having a cleaning passage leading from the portion chamber to the exterior of the valve body; and a control member for selectively blocking and unblocking said cleaning passage.

8. A valve as defined in claim 7 wherein the control member includes a cleaning valve having an open position to allow fluid to exit the portion chamber through the cleaning passage and a closed position to prevent fluid from exiting the portion chamber through the cleaning passage.

9. A valve as defined in claim 7 wherein the control valve includes a normally closed valve mounted on the valve body, said normally closed valve being openable in response to movement of the pumpable material toward the outlet.

10. A valve as defined in claim 7 wherein the first passage includes a discharge chamber having a wall upstream of the outlet and the valve element includes a deflecting surface positioned so that with the valve element in the discharge position the flowable material from the portion chamber is directed toward the wall.

11. A control valve comprising:
a valve body having an inlet, an outlet, a passage leading from the inlet to the outlet and a cavity communicable with the passage, said passage including a discharge chamber having a wall upstream of the outlet;
a movable wall in said cavity dividing the cavity into a portion chamber communicable with the passage and a secondary chamber;
a resilient element in the secondary chamber for biasing the movable wall in a direction to reduce the volume of the portion chamber whereby the portion chamber is made resiliently expandable;
a valve element movable in the valve body between a charging position in which the valve element allows flow of flowable material from the inlet through the passage to the portion chamber to resiliently expand the portion chamber against the biasing action of the resilient element and blocks flow of flowable material from the portion chamber through the passage to the outlet and a discharge position in which the valve element blocks flow of flowable material from the inlet through the passage to the portion chamber and allows flow of flowable material from the portion chamber through the passage to the outlet so that the resilient element can force the flowable material from the portion chamber toward the outlet; and
the valve element including a deflecting surface positioned so that with the valve element in the discharge position the flowable material from the portion chamber is directed toward the wall.

12. A valve as defined in claim 11 wherein the control valve includes a normally closed valve mounted on the valve body, said normally closed valve being openable in response to movement of the flowable material toward the outlet.

13. A valve as defined in claim 12 including a plurality of inserts each of which has a different length to control the maximum volume of the portion chamber.

14. A control valve comprising:
a valve body having an inlet, an outlet, a passage leading from the inlet to the outlet and a cavity communicable with the passage;
a movable wall in said cavity dividing the cavity into a portion chamber communicable with the passage and a secondary chamber, said portion chamber having a variable maximum volume;
a resilient element in the secondary chamber for biasing the movable wall in a direction to reduce the volume of the portion chamber whereby the portion chamber is made resiliently expandable;
a plurality of inserts each of which has a different length to control the maximum volume of the portion chamber; and
a valve element movable in the valve body between a charging position in which the valve element allows flow of flowable material from the inlet through the passage to the portion chamber to resiliently expand the portion chamber against the biasing action of the resilient element and blocks flow of flowable material from the portion chamber through the passage to the outlet and a discharge position in which the valve element blocks flow of flowable material from the inlet through the passage to the portion chamber and allows flow of flowable material from the portion chamber through the passage to the outlet so that the resilient element can force the flowable material from the portion chamber toward the outlet.

15. A valve as defined in claim 14 wherein the valve includes an elongated tube mounted on the valve body and extending into the secondary chamber and any of said inserts is receivable in said tube to form a stop to limit the maximum volume of the portion chamber.

16. A valve as defined in claim 15 wherein the tube is threadedly coupled to the valve body whereby the location of said stop can be changed to change the maximum volume of the portion chamber.

17. A method of delivering a flowable condiment comprising:
supplying the flowable condiment under pressure through an inlet passage of a control valve to a resiliently expandable portion chamber with the control valve blocking flow of the flowable condiment from the portion chamber through an outlet passage to an outlet of the control valve;
actuating the control valve to block the inlet passage to prevent the flowable condiment from being supplied to the portion chamber and opening the outlet passage to allow the resiliently expandable portion chamber to contract and move the flowable condiment from the portion chamber toward the outlet; and
delivering the flowable condiment by passing the flowable condiment through only one normally closed valve which is openable in response to movement of the flowable condiment from the portion chamber toward the outlet.

18. A method as defined in claim 17 wherein the control valve has a valve element movable between a charging position and a discharge position, the control valve is in the charging position during the step of supplying and is in the discharge position when the outlet passage is open, said method including manually moving the valve element from the charging position to the discharge position.

19. A method as defined in claim 17 which includes deflecting the flowable condiment against a wall between the portion chamber and the outlet to dissipate energy of the flowable condiment.

20. A method of delivering a flowable condiment comprising:
supplying the flowable condiment under pressure through an inlet passage of a control valve to a resiliently expandable portion chamber with the control valve blocking flow of the flowable condiment from the portion chamber through an outlet passage to an outlet of the control valve;
actuating the control valve to block the inlet passage to prevent the flowable condiment from being supplied to the portion chamber and opening the outlet passage to allow the resiliently expandable portion chamber to contract and move the flowable condiment from the portion chamber toward the outlet; and
deflecting the flowable condiment against a wall between the portion chamber and the outlet to dissipate energy of the flowable condiment.

* * * * *